No. 775,751.

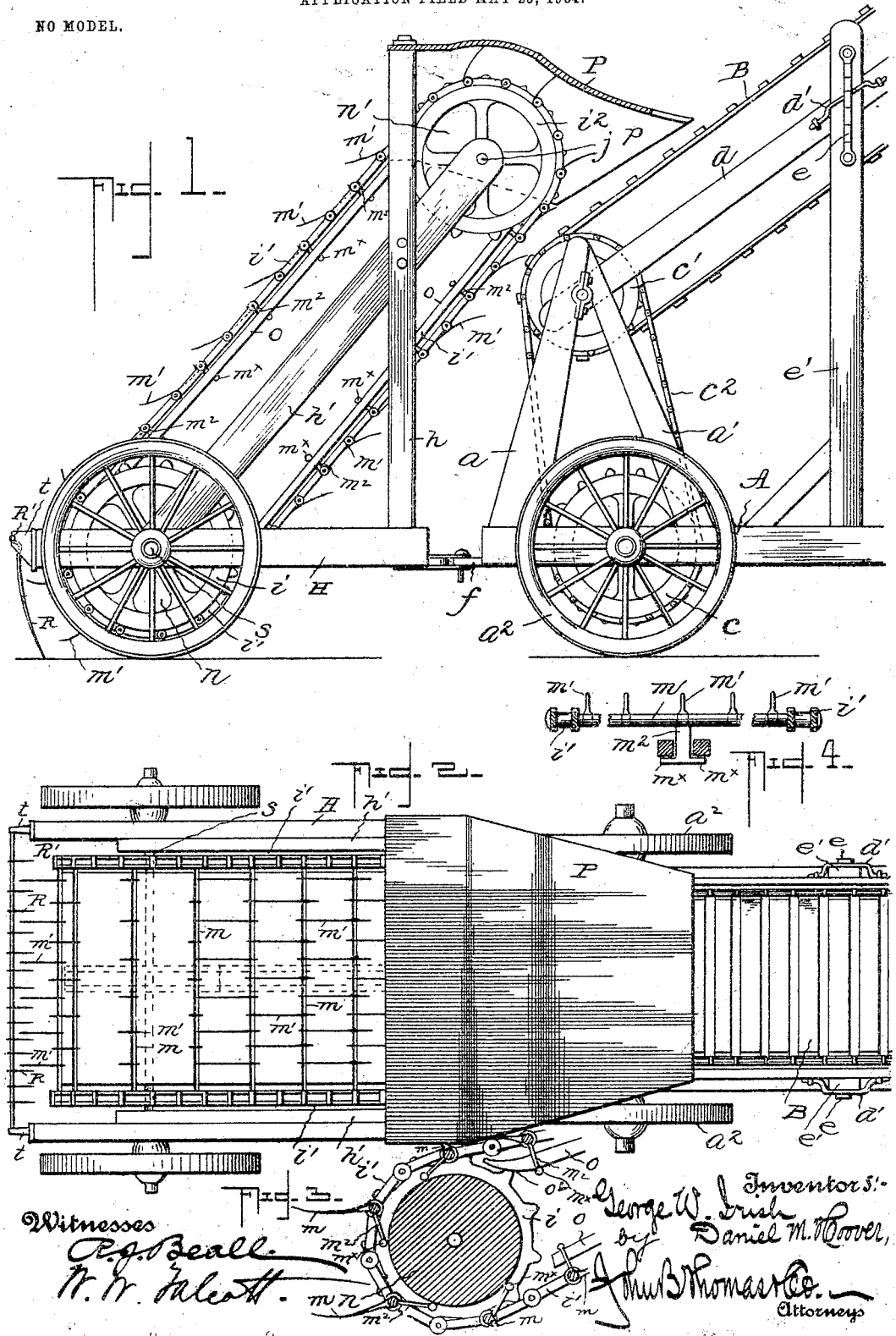

Patented November 22, 1904.

UNITED STATES PATENT OFFICE.

GEORGE W. IRISH AND DANIEL M. HOOVER, OF GRAND LEDGE, MICHIGAN.

HAY RAKE AND ELEVATOR.

SPECIFICATION forming part of Letters Patent No. 775,751, dated November 22, 1904.

Application filed May 25, 1904. Serial No. 209,784. (No model.)

*To all whom it may concern:*

Be it known that we, GEORGE W. IRISH and DANIEL M. HOOVER, citizens of the United States, residing at Grand Ledge, in the county of Eaton and State of Michigan, have invented certain new and useful Improvements in Hay Rakes and Elevators, of which the following is a specification.

This invention is an improvement in hay rakes and elevators; and the primary objects of the invention are to provide a machine of this character of light construction adapted to be attached to and drawn by the wagon upon which the hay is to be loaded and so arranged that the hay will be picked up and elevated by a wide conveyer-belt and deposited in a compact form upon a narrower apron, by which latter it is still further elevated and deposited upon the wagon.

A further object of the invention is to so construct and arrange the parts of the machine that the said machine in use may be turned short.

Other though minor objects of the invention will hereinafter appear, and the novel features of construction upon which we desire to secure protection by Letters Patent will be more specifically set forth in the appended claims.

In the accompanying drawings, which form a part of this specification, Figure 1 is a side elevation of a hay rake and elevator constructed in accordance with our invention. Fig. 2 is a plan view of the same. Fig. 3 is a detail sectional view through one of the rollers and showing the disposition of the conveyer-belt and its trip-plates with relation thereto. Fig. 4 is a detail view in transverse section of the conveyer-belt and including the guide-rails between which the trip-plates of the conveyer-belt travel.

Like letters of reference indicate like parts in all the views of the drawings.

In carrying out our invention we provide in the first place a wheeled frame A, upon which is mounted an endless apron B, adapted to receive the hay from the conveyer-belt, hereinafter described, the said endless apron being adjustably supported so that the forward end thereof may be raised as the pile or load on the wagon increases. For the purpose of supporting this endless apron converging uprights $a$ and $a'$ are attached to the rear end of the wheeled frame A, and mounted in the upper end of the same is a transverse shaft $b$, which latter is provided with rollers over which said belt passes. The belt is driven from the ground-wheels $a^2$ by sprocket-wheels $c$ and $c'$ on the axle and shaft, respectively, a chain $c^2$ passing over said sprocket-wheels to connect them. Running parallel with the apron and supporting the upper end thereof is a longitudinal supporting-bar $d$, which at an intermediate point is provided with a bail or loop $d'$, adapted to engage any one of a series of steps on a bracket $e$ on the upright $e'$, and thereby support the upper end of the apron at the desired height, it being understood that as the height of the load on the wagon increases the said forward end of the endless apron is raised.

Pivotally connected to the wheeled frame A by means of the connection $f$ shown is a second wheeled frame, H, which latter is adapted to carry the conveyer-belt, that picks up the hay and delivers it to the endless apron. This wheeled frame H is provided near its front end with the uprights $h$, to which are secured diagonal beams $h'$, the latter extending from near the rear end of said wheeled frame on a line with the axle of the supporting-wheels thereof. On the axle $s$ of this wheeled frame H are sprocket-wheels $i$, connected by chains $i'$ to sprocket-wheels $i^2$, which latter are mounted on a transverse shaft $j$, supported at the upper ends of the diagonal beams $h'$. These sprocket-chains are connected by rods or bars $m$, to which latter are secured the rake teeth or fingers $m'$, which gather up the hay and convey it to the endless apron, and to swing these rake teeth or fingers to and from the conveyer at the proper time or to the positions shown in the drawings the said rods or bars $m$ are provided centrally with spring-metal trip-plates $m^2$, having lateral projections $m^x$ at their free ends. These trip-plates are adapted to strike and travel over the peripheries of rollers $n$ and $n'$ on the axle $s$ and shaft $j$, respectively, in which instance they are shifted by said rollers from an extended position to a position nearly parallel with the chains and being fixed to the rods or bars $m$ shift the rake teeth or fingers carried thereby. It will be seen that the rake-teeth are shifted and held outward during the travel of the trip-plates over the rollers being shifted by the roller $n$ at the lower end of the frame to gather up the hay and by the roller $n'$ at the upper end of the frame to carry the hay through a reducer, hereinafter described. After the rake-teeth pass over the lower roller they are thrown backward, as shown, and are retained in this position by the guide-rails $o$ until they reach the upper roller, said rake teeth or fingers being thrown to this position so as to loosen up the hay and permit it to be more easily brought together or closer with reference to its lateral disposition. Where the guide-rails $o$ commence from each roller they are provided with curved surfaces $o'$, over which the lateral projections $m^{\times}$ of the trip-plates $m^2$ ride in shifting such trip-plates from one position to the other.

The trip-plates are made of spring metal in order that they may give or yield when they strike the rollers and will also permit the rake teeth or fingers to yield in the event they strike an obstruction.

By reference to Fig. 2 of the drawings it will be seen that the conveyer-belt is wider than the endless apron, so that the rake and elevator may cover a considerable area, and in order that the lateral disposition of the hay may be reduced before delivery to the endless apron we provide the reducer P, which comprises a large plate or hood placed over the upper end of the conveyer-belt and gradually reduced in width therefrom to the endless apron, over the lower end of which latter it projects. Said hood is provided with the depending sides $p$, between which the hay passes and by which it is brought closer for delivery to the endless apron. This reducer or hood is secured to the upper ends of the uprights $h$, and in addition to bringing the hay closer together it also protects the hay from the wind and prevents it from being blown from the machine in passing from the conveyer to the endless apron.

The conveyer-belt having the rake teeth or fingers is adapted to pick up the hay and convey it to the apron, and to provide for gathering the hay so that it will be picked up by said rake teeth or fingers we employ a series of long rake-teeth R, depending from a cross-bar R', the latter being supported from the rear end of the frame H in brackets $t$. These teeth gather the hay as the machine moves forward, and the rake-teeth $m'$ of the endless conveyer pick it up. Said rake-teeth R are preferably shaped as shown so that the ends of the rake teeth or fingers of the conveyer may pass between them.

Having thus described our invention, what we claim as new, and desire to secure by Letters Patent, is—

1. In a hay rake and elevator, the combination, of a wheeled frame carrying an endless apron and means for adjusting the forward end of the latter, and a conveyer-belt having rake teeth or fingers, said conveyer-belt being mounted on a separate wheeled frame pivotally connected to the aforesaid frame; together with a reducer P over the upper end of the conveyer and converging toward the endless apron, substantially as shown and described.

2. In a hay rake and elevator, the combination, of an endless apron mounted on a wheeled frame and adjustable vertically at its forward end, means for securing such adjustment; a conveyer-belt having rake teeth or fingers and mounted on a separate wheeled frame pivotally connected to the aforesaid frame, the conveyer-belt being wider than the endless apron, and a reducer P for the hay located over the upper end of the conveyer-belt and reduced in width therefrom to a point over the endless apron, substantially as shown and described.

3. In a hay rake and elevator, the combination, of an endless apron and supporting means therefor, comprising a wheeled frame having uprights at its rear end to which the endless apron is pivoted at one end, an upright on the wheeled frame, a stepped bracket on said upright, and a bail or loop on the supporting-bar of the endless apron engaging said stepped bracket; together with a conveyer-belt having rake teeth or fingers and mounted on a separate wheeled frame pivotally connected to the aforesaid wheeled frame, and a reducer P for the hay located over the upper end of the conveyer-belt and reduced in width to a point over the endless apron, substantially as shown and described.

4. In a hay rake and elevator, the combination, of an endless conveyer comprising rake teeth or fingers carried by pivoted cross-bars, spring-metal trip-plates projecting inward from said cross-bars, and rollers at the ends of the conveyer over which the trip-plates travel to throw the rake-teeth outward; a series of rake-teeth R attached to the rear end of the machine to gather the hay for the conveyer; an endless apron below the upper end of the conveyer and narrower than the latter, and the reducer P located over the upper end of the conveyer and converging toward the endless apron and through which reducer the hay is carried and brought closer for delivery to the apron, as herein shown and described.

In testimony whereof we have signed our names to this specification in the presence of two subscribing witnesses.

GEORGE W. IRISH.
DANIEL M. HOOVER.

Witnesses:
  J. H. WALSH,
  S. R. COOK.